July 15, 1952  E. C. BETTONI  2,603,313

REMOVABLE IGNITION LUBRICATOR

Filed June 1, 1948

Eugene C. Bettoni
INVENTOR.

BY Stanley M. Udale

Patented July 15, 1952

2,603,313

UNITED STATES PATENT OFFICE 2,603,313

REMOVABLE IGNITION LUBRICATOR

Eugene C. Bettoni, Bloomfield Hills, Mich., assignor to George M. Holley and Earl Holley Application June 1, 1948, Serial No. 30,393

1 Claim. (Cl. 184—102)

The general object is to improve the lubrication of an automobile ignition system.

The specific object of this invention is to prolong the period between adjustments of the contact points on an ignition system for an automobile.

Figure 1:
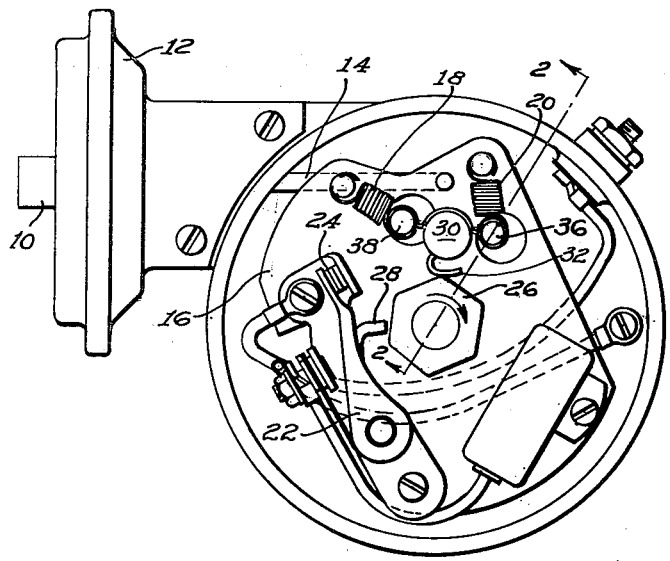
Fig. 1 shows a plan view of the preferred form of my invention.
Figure 2:
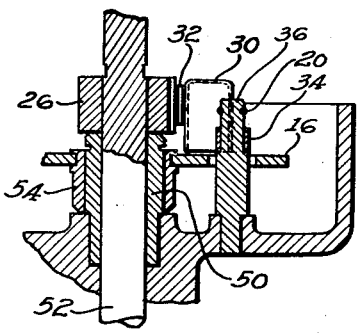
Fig. 2 shows a cross sectional elevation on plane 2—2 of Fig. 1.
Figure 3:
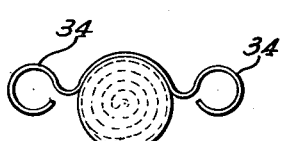
Fig. 3 is the plan view of the lubricator element.
Figure 5:
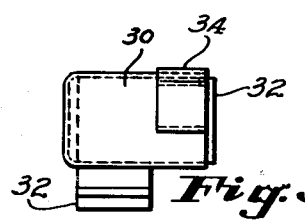
Fig. 5 is a side view of the lubricator element.
Figure 4:
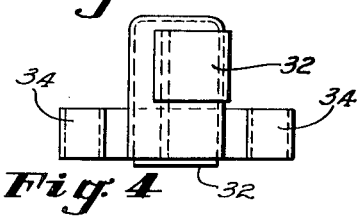
Fig. 4 is the front elevational view of the lubricator element.

In Figs. 1 and 2, 10 is the connection with the suction of the inlet of the engine. 12 is the case containing a diaphragm which responds to the suction applied through the pipe 10. 14 is a rod connected to a plate 16 and to the diaphragm inside the case 12. 18 and 20 are the springs which oppose the rotation of the plate 16 in an anti-clockwise direction in response to the suction applied to passage 10 to advance the time of the ignition. These springs are anchored to the posts 38 and 36 which are stationary.

A circuit breaker arm 22 carries a tungsten contact 24 which is opened when the cam 26 engages with a fiber rubbing block 28 mounted in the circuit breaker arm 22.

A spring holds the rubbing block 28 firmly pressed against the rotating cam 26 at all times.

So far this describes the conventional ignition system of the pressure type.

The novel feature of my invention comprises an inverted lubricating casing or reservoir 30 and a helical wick 32 which feeds a very small supply of oil continuously to the surface of the cam 26 and also to the surface of the plate 16.

A clip 34 engages with the posts 36 and 38 so as to anchor the lubrication device in place and it is soldered to the casing 30.

A bearing 50 of the type known as oilless acts internally as a bearing for the shaft 52 and acts externally as a bearing for the plate 16. A drive shaft 52 is guided in a bearing 50 which also acts as the bearing for the tube 54 which is locked to the plate 16.

Operation

If the contact points are run for 1,000 miles and then readjusted, another 1,400 miles can be gotten before another readjustment is due and is called for.

If the rate of wear of the rubbing block 28 equals the rate at which the tungsten points burn away, a balance is attained so that the device can operate for many thousands of miles between adjustments of the contact points 24.

The surplus oil from the inverted cup 30, which contains the wick 32, acts as a lubricating reservoir which also lubricates both the inside and outside wearing surfaces of the oilless bushing 50.

Oil reaches the outside of the bearing 50 by capillary attraction from the plate 16. Oil reaches the inside of the bearing 50 from the cam 26 by gravity.

It will be noted in Fig. 2 that each of the two ears 34 is slidably mounted on pins 36—38 and that to remove the element 30, to refill with a new oil wick 32, it is necessary to remove the springs 18—20.

It will also be noted that the cup 30 and wick 32 are secured in place by the ends of the two springs 18 and 20 which seat in grooves in the pins 36—38.

What I claim is:

A detachable sheet metal stationary lubricating device for a rotating element of a device having two pins parallel to the axis of rotation comprising a hollow cylinder closed at one end, two side arms extending therefrom and forming cylindrical supports for the hollow cylinder, the two side arms being adapted to be slid into place on said two pins, coiled lubricating pad inside the hollow cylinder, and a slot in the wall of the cylinder through which the lubricating pad extends.

EUGENE C. BETTONI.

REFERENCES CITED

The following references are of record in the file of this patent:

UNITED STATES PATENTS

| Number | Name | Date |
|---|---|---|
| 2,007,217 | Rose | July 9, 1935 |
| 2,265,047 | Tognola | Dec. 2, 1941 |
| 2,330,028 | Coe et al. | Sept. 31, 1943 |
| 2,435,128 | Carlson | Jan. 27, 1948 |
| 2,465,529 | Grant | Mar. 29, 1949 |
| 2,485,998 | Bales | Oct. 25, 1949 |

FOREIGN PATENTS

| Number | Country | Date |
|---|---|---|
| 554,803 | Great Britain | July 20, 1943 |